United States Patent
Overes

(10) Patent No.: US 7,864,204 B2
(45) Date of Patent: Jan. 4, 2011

(54) DISPLAY SYSTEM

(75) Inventor: Theodorus Franciscus Emilius Maria Overes, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 883 days.

(21) Appl. No.: 11/719,963

(22) PCT Filed: Nov. 25, 2005

(86) PCT No.: PCT/IB2005/053902

§ 371 (c)(1), (2), (4) Date: May 23, 2007

(87) PCT Pub. No.: WO2006/059263

PCT Pub. Date: Jun. 8, 2006

(65) Prior Publication Data

US 2009/0225065 A1      Sep. 10, 2009

(30) Foreign Application Priority Data

Nov. 30, 2004   (EP)   ................... 04106177

(51) Int. Cl.
*G09G 3/36*   (2006.01)

(52) U.S. Cl. .......................... 345/905; 345/102; 345/82

(58) Field of Classification Search .................. 345/207, 345/212–214, 905, 903, 82, 83; 348/739
See application file for complete search history.

(56) References Cited

U.S. PATENT DOCUMENTS

| | | | |
|---|---|---|---|
| 6,157,143 A * | 12/2000 | Bigio et al. .................. 315/307 |
| 6,292,228 B1 | 9/2001 | Cho | |
| 6,611,297 B1 * | 8/2003 | Akashi et al. ................ 348/739 |
| 6,618,045 B1 | 9/2003 | Lin | |
| 6,762,741 B2 * | 7/2004 | Weindorf ..................... 345/102 |
| 7,121,944 B2 * | 10/2006 | Gauselmann ................ 463/30 |
| 2002/0015097 A1 | 2/2002 | Martens et al. | |
| 2002/0024529 A1 | 2/2002 | Miller et al. | |
| 2002/0109664 A1 * | 8/2002 | Shimada ...................... 345/102 |
| 2002/0171637 A1 | 11/2002 | Kadowaki et al. | |
| 2003/0122810 A1 | 7/2003 | Tsirkel et al. | |
| 2003/0234785 A1 | 12/2003 | Matsuda et al. | |
| 2004/0070565 A1 * | 4/2004 | Nayar et al. ................. 345/156 |
| 2005/0041161 A1 * | 2/2005 | Dowling et al. ............. 348/739 |

FOREIGN PATENT DOCUMENTS

| | | |
|---|---|---|
| EP | 0993237 A2 | 4/2000 |
| WO | WO0060855 A1 | 10/2000 |
| WO | WO0117240 A1 | 3/2001 |
| WO | WO03055273 A2 | 7/2003 |

* cited by examiner

*Primary Examiner*—Kevin M Nguyen

(57) ABSTRACT

A display system (20, 100, 300, 320) is provided for presenting images to a viewer (50) together with complementary peripheral surround-lighting (130). The system (20, 100, 300, 320) includes a monitor (20) for presenting the images to the viewer (50), and lights (100) for generating the surround-lighting (130) appearing in operation to the viewer (50) as at least partially peripherally surrounding the monitor (20). Moreover, the system (20, 100, 300, 320) further includes a controller (320) for energizing the lights (100) in response to properties of portions of the images presented on the monitor (20), and a sensor (300, 310) for sensing the surround-lighting (130) and/or environmental illumination and generating corresponding sensor signals (330). The controller (320) is arranged in operation to receive the sensor signals (330) for controlling the lights (100) for at least partially compensating the surround-lighting (130) to influence from the environmental illumination.

16 Claims, 8 Drawing Sheets

DISPLAY SYSTEM

FIELD OF THE INVENTION

The present invention relates to a display system for presenting images to a viewer wherein the system includes a display monitor and an associated surround-lighting unit operable to provide surround-lighting complementary to images presented on the monitor. Moreover, the present invention also concerns a method of operating such a display system.

BACKGROUND TO THE INVENTION

Apparatus for presenting images to viewers are well known and include televisions and computer monitors. Televisions are contemporarily implemented using cathode ray tubes, liquid crystal displays employing pixel arrays, plasma displays, light emitting diode (LED) displays to mention a few contemporary examples. For televisions, there is a growing desire for relatively broad screens to accommodate high-definition television (HDTV) program content. However, relatively large displays for televisions are costly to manufacture and tend also to be bulky, especially when implemented using cathode ray tube technologies. It has been appreciated that it is not necessary to increase both screen resolution and display size in order to provide viewers with an enhanced viewing experience because viewers are less able to distinguish fine detail at a perimeter of their field of vision in comparison to a central region thereof. Thus, an enhanced visual experience for viewers can be provided by employing surround-lighting wherein a surrounding halo of illumination dynamically complementary to images presented on a monitor is provided around the monitor.

Such surround-lighting can be provided by way of light-sources 10 arranged around a monitor 20 as schematically illustrated in FIG. 1, or by backward illumination 30 for illuminating a region 40 behind the monitor 20 relative to a viewer 50 as schematically illustrated in FIG. 2. In FIG. 2, the backward illumination 30 is optionally directed to provide a halo of illumination 60 around the monitor 20 when viewed by the viewer 50 as depicted in FIG. 3. Whereas use of the light-sources 10 arranged around the monitor 20 increases an overall physical size and hence bulk of an overall housing for the monitor 20, backward illumination can be implemented without increasing monitor size significantly. However, the use of the backward illumination 30 for generating the surround-lighting, namely halo of illumination 60, requires a light-reflecting surface to be placed behind the monitor 20, the reflecting surface corresponding to the aforementioned region 40. The surface can be beneficially implemented as white reflecting panels attached to the monitor 20, for example rotatably-mounted fold-out panels or attachable panels, or more simply by mounting or positioning the monitor 20 in close proximity to an existing wall or similar existing surface. However, such existing surfaces can be of unpredictable color depending upon where the viewer chooses to place the monitor 20, such unpredictable color potentially affecting the color and quality of the surround-lighting 60 achieved by this backward illumination 30 which represents a technical problem addressed by the present invention. Moreover, environmental illumination around the monitor 20, such environmental illumination arising from room lighting and/or sunlight, can affect the quality of the surround-lighting 60 as perceived by the viewer 50. A conventional solution is simply to require that the monitor 20 be mounted in proximity to a white surface or provide the monitor 20 with deployable white surfaces for reflecting the backward-illumination 30 towards the viewer 50.

It is known to actively control color of images presented on a display implemented using a cathode ray tube. For example, in a published U.S. Pat. No. 6,292,228, there is described a device for automatically adjusting condition of images presented on the display. The device is operable to optimize the condition of images according to viewer preferences by taking into account the brightness and color temperature selected by the viewer for the display. In particular, the device includes a photosensor operable to sense environmental illumination and generating a corresponding signal indicative of the environmental illumination. The processor is operable to use the signal and user settings for controlling operation of the display, thereby optimizing operation of the display in response to changes in environmental illumination.

SUMMARY OF THE INVENTION

An object of the present invention is to provide a display system including a display and an associated surround-lighting unit which, in operation, are less influenced by variations in environmental conditions in which the display system is required to operate.

According to a first aspect of the present invention, there is provided a display system for presenting images to a viewer together with complementary peripheral surround-lighting, said system including:

(a) a monitor for presenting the images to the viewer;

(b) one or more lights for generating said surround-lighting appearing in operation to the viewer as at least partially peripherally surrounding the monitor;

(c) a controller for energizing said one or more lights in response to properties of portions of the images presented on the monitor and one or more control parameters; and (d) one or more sensors for sensing said surround-lighting and/or environmental illumination incident at the system and generating one or more corresponding sensor signals, wherein said controller is arranged in operation to receive said one or more sensor signals for controlling said one or more lights for at least partially compensating according to said one or more control parameters color and/or brightness of the surround-lighting to influence from the environmental illumination.

The invention is of advantage in that the controller is capable of adjusting the surround-lighting so that it better matches the images presented on the monitor and thereby provides a more realistic impression to a viewer of the display system.

Optionally, in the display system, the one or more sensors operable in conjunction with the controller are arranged to function substantially in a feed-forward control manner to control said peripheral surround-lighting in response to the sensed environmental illumination.

Optionally, in the display system, one or more lights are disposed so as to generate the surround-lighting by way of reflection of illumination provided in operation from said one or more lights from a surface in operation behind the monitor relative to the viewer. Such an arrangement is capable of being less obtrusive, especially when the surface is a wall onto which the monitor is mounted for example.

More optionally, in the display system, said one or more sensors are positioned substantially at said surface wherefrom illumination from said one or more lights is reflected to generate said surround-lighting. Such an arrangement is especially beneficial when the display system is designed to be wall-mountable in a manner akin to a wall-mounted picture or painting.

Optionally, in the display system, the controller is operable to at least partially compensate the surround-lighting from influence of the environmental illumination encountered in a location where the system is deployed. This at least partial compensation enables the display system to function more optimally in changing general lighting conditions, for example when room lights are switched on or off.

Optionally, in the display system, said one or more sensors are positioned so as to sense in operation said surround-lighting from substantially behind the monitor relative to the viewer. Such positioning for the one or more sensors is of benefit in that the viewer is then not normally aware of their presence. Moreover, the one or more sensors are capable of receiving a direct and unambiguous indication of surround-lighting hue and brightness.

Optionally, in the display system, said one or more sensors are positioned so as to sense in operation said surround-lighting in front of said monitor substantially intermediate between the monitor and the viewer. Such positioning of the one or more sensors is of benefit in that a more realistic assessment of the surround-lighting can be achieved for feedback purposes to finely adjust the surround-lighting. Moreover, the one or more sensors are also capable of monitoring the monitor, thereby potentially accommodating automatic feedback adjustment of brightness and hue of the monitor also. Thus, more optionally, in the display system, said controller is arranged to provide feedback color and/or brightness adjustment of both the images presented in operation on said monitor and said surround-lighting.

Optionally, in the display system, said one or more sensors are implemented by one or more pixel array cameras operable to spatially sense said surround-lighting. Such an implementation of the one or more sensors is of benefit in that pixel array cameras are potentially inexpensive, compact and provide output signals in a convenient output data-stream format for the controller.

Optionally, in the display system, said controller is operable to substantially match spatially said surround-lighting to one or more colors at one or more peripheries of images presented on said monitor.

The aforementioned display system is also capable of being implemented by retrofitting a surround-lighting device to existing monitors.

According to a second aspect of the present invention, there is provided a surround-lighting device for a monitor operable to present images to a viewer, said device being operable to provide peripheral surround-lighting complementary to said images, said device comprising:

(a) one or more lights for generating said surround-lighting appearing in operation to the viewer as at least partially peripherally surrounding the monitor;

(b) a controller for energizing said one or more lights in response to properties of portions of the images presented on the monitor and one or more control parameters; and (c) one or more sensors for sensing said surround-lighting and generating one or more corresponding sensor signals, wherein said controller is arranged in operation to receive said one or more sensor signals for controlling said one or more lights for at least partially compensating according to said one or more control parameters color and/or brightness of the surround-lighting to influence from the environmental illumination.

According to a third aspect of the present invention, there is provided a method of controlling peripheral surround-lighting for a monitor operable to present images to a viewer, said method including steps of:

(a) using one or more sensors for sensing said surround-lighting and/or environmental illumination and generating one or more corresponding sensor signals; and (b) controlling energization of one or more lights for generating said surround-lighting in response to properties of portions of the images presented on the monitor, said sensor signals and one or more control parameters so that said peripheral surround-lighting is complementary to said images, wherein the surround-lighting is at least partially compensated for influences from environmental illumination substantially at the monitor.

Optionally, the method further comprises a step of selectively stimulating the monitor and the one or more lights for determining which of said sensor signals is representative of the surround-lighting and then controlling said one or more lights in response to said determined signals representative of the surround-lighting. Such a step enables automatic association of the feedback signals to corresponding regions of the surround-lighting.

According to a fourth aspect of the present invention, there is provided software for implementing a method according to the third aspect of the invention.

According to a fifth aspect of the present invention, there is provided a sensor configuration for implementing said one or more sensors of the display system according to the first aspect of the invention, or for implementing said one or more sensors of the method according to the third aspect of the invention.

It will be appreciated that features of the invention are susceptible to being combined in any combination without departing from the scope of the invention.

DESCRIPTION OF THE DIAGRAMS

Embodiments of the invention will now be described, by way of example only, with reference to the following diagrams wherein.

DESCRIPTION OF EMBODIMENTS OF THE INVENTION

Figure 1:
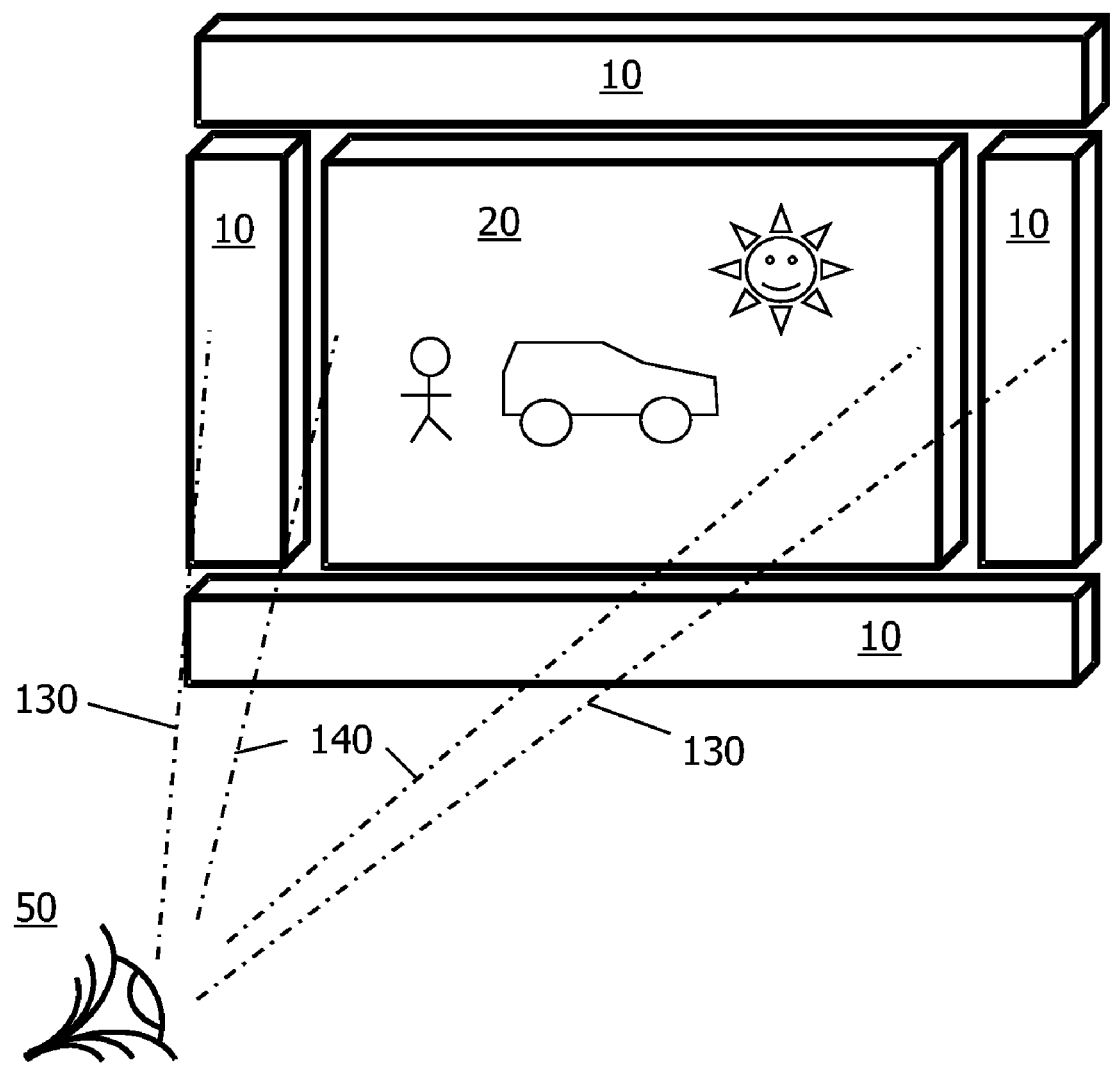
FIG. 1 is an illustration of a monitor provided with surround-lighting by way of light sources arranged peripherally around the monitor.

The same reference numerals used in different Figs. represent the same or similar item.

Figure 2:
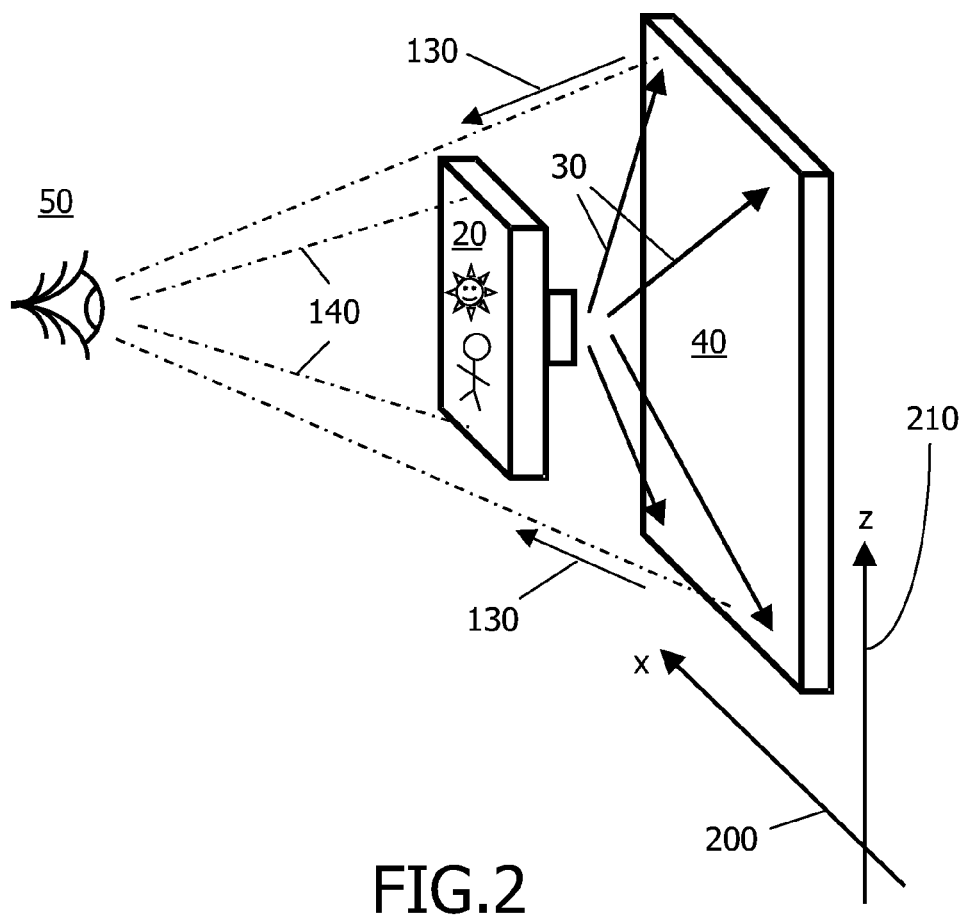
FIG. 2 is an illustration of a monitor provided with surround-lighting by way of backward illumination for illumination a region behind the monitor.
Figure 4:
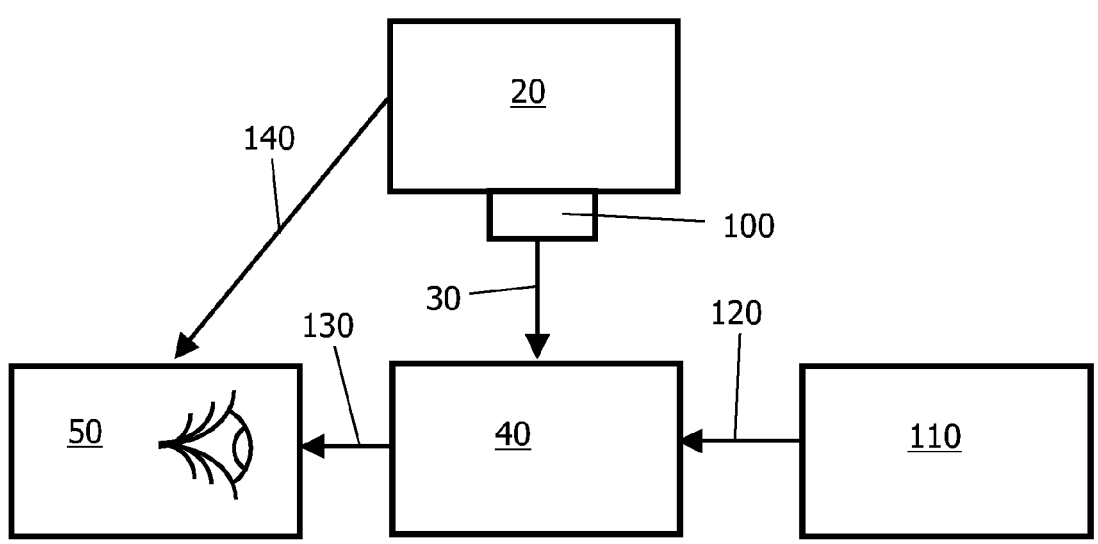
FIG. 4 is an illustration of light components contributing to an image observed by the viewer.

The inventors have appreciated that the surround-lighting provided by way of backward illumination 30 as illustrated in FIG. 2 is susceptible to being adversely influenced by ambient illumination in a room or similar environment in which the monitor 20 is located. Such influence is represented graphically in FIG. 4 in which a backward-lighting unit 100 is mounted at a rear region of the monitor 20 to project the backward illumination 30 towards the region 40 which is also influenced by environmental illumination 120 from ambient light sources 110, for example sunshine and room lights. Surround-lighting 130 reflected from the region 40 is thus a combination of a reflected portion of the backward illumination 30 and a reflected portion of environmental illumination 120. Moreover, as described in the foregoing, the region 40 itself can correspond to a wall of a room which is painted a color other than white, such color thereby spectrally influencing an appearance of the surround-lighting 130 to the viewer 50. Expressed mathematically, Equation 1 (Eq. 1) describes factors influencing the surround-lighting 130:

$$I_{sl}=F(I_{amb}+I_{bw},K) \quad \text{Eq. 1}$$

wherein $I_{sl}$=surround-lighting 130;

$I_{amb}$=ambient illumination 120;

$I_{bw}$=backward-illumination 30;

K=surface color of the region 40; and

F=function describing the surround-lighting 130.

Figure 8:
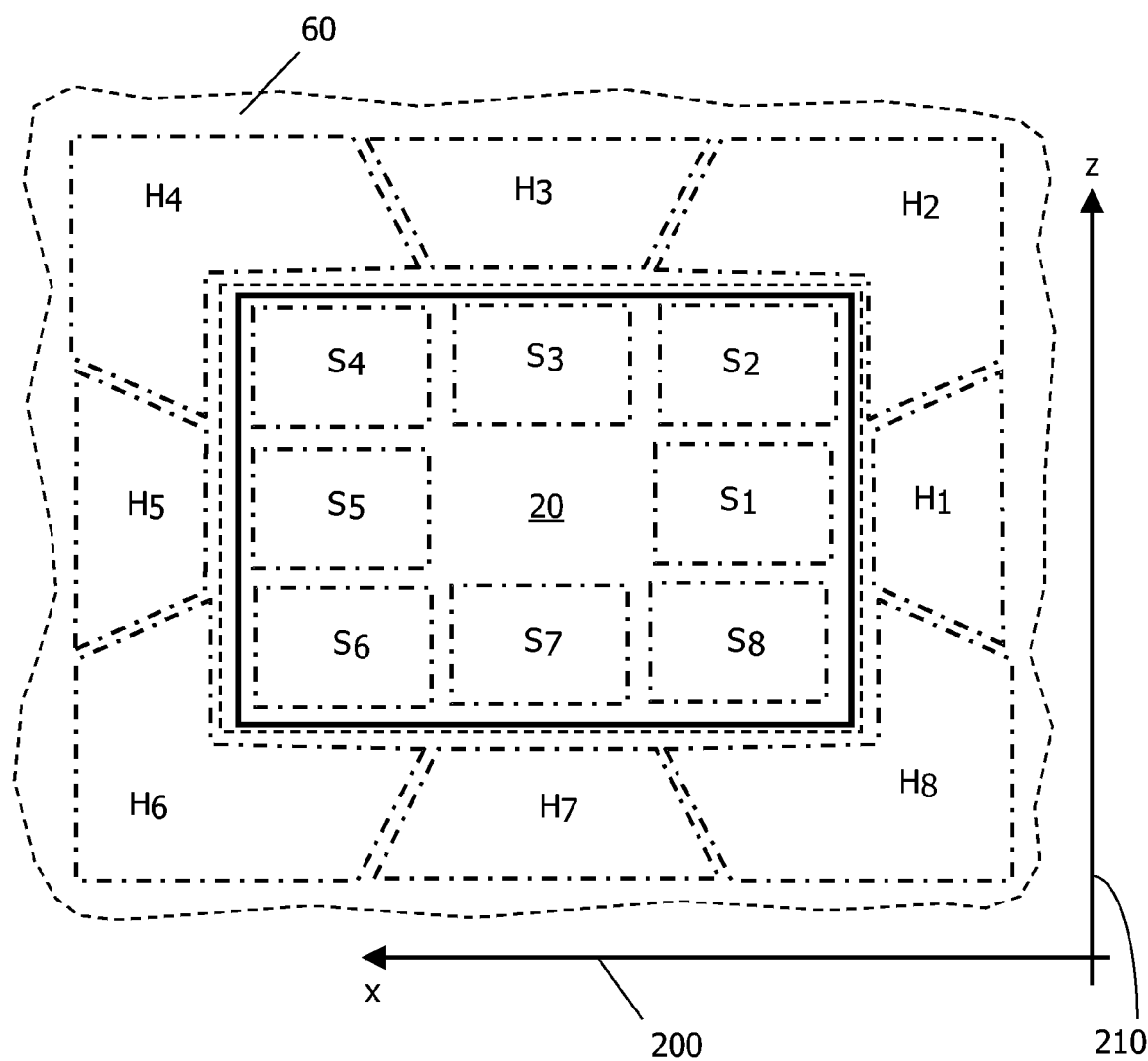
FIG. 8 is a schematic diagram of a monitor with peripheral display regions identified from which hue and brightness information is derived for modulating corresponding regions of surround-lighting.

In Equation 1, it will be appreciated that parameters $I_{sl}$, $I_{amb}$, $I_{bw}$, and K describe optical spectra. Moreover, these parameters are also optionally spatially dependent on account of the region 40 being illuminated unevenly by environmental illumination, for example:

(a) $I_{amb}$ is spatially dependent on account of shadows caused by occluding room objects and even the monitor 20 itself casting a shadow therebehind;

(b) $I_{bw}$ is spatially dependent on account of the surround-lighting $I_{sl}$ 130 optionally matching a color of features presented near peripheral regions of the monitor 20 as described later with reference to FIG. 8; and (c) the region 40 is potentially of spatially non-uniform color.

Figure 3:
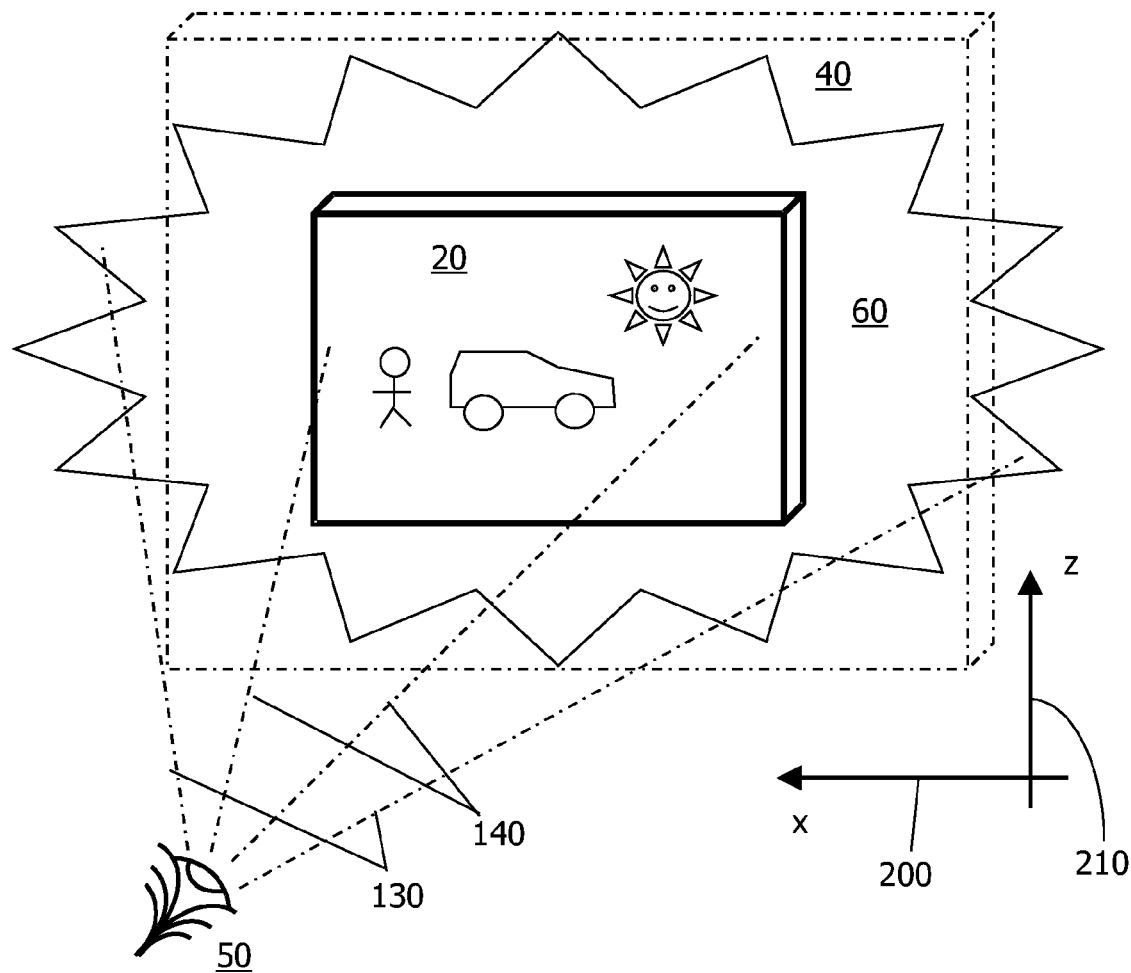
FIG. 3 is an illustration of viewer-perceived surround-lighting.

Thus, in more generalized form, the surround-lighting 130 is more completely described by Equation 2 (Eq. 2) wherein spatial directions x, z are represented by axes 200, 210 respectively in FIGS. 2 and 3, and λ is indicative of light wavelength:

$$I_{sl}(x,z,\lambda)=F(I_{env}(x,z,\lambda)+I_{bw}(x,z,\lambda),K(x,z,\lambda)) \quad \text{Eq. 2}$$

The inventors have appreciated that it is desirable to at least partially compensate the surround-lighting $I_{sl}$ 130 to influence from the environmental illumination $I_{env}$. Optionally, the surround-lighting $I_{sl}$, 130 is also at least partially compensated with regard to optical properties K of the region 40. A most straightforward approach to correct for K is to provide aforementioned deployable panels having white optical finish; however, such an approach does not compensate for ambient illumination effects. In consequence, in an advanced embodiment of the invention, the inventors have devised a control configuration wherein the surround-lighting 130 is automatically adjusted in response to image color at peripheral regions of the monitor 20 depicted by 140 instead of the backward illumination $I_{bw}$ being so adjusted to image color at these peripheral regions 140. By so arranging feedback, effects of both $I_{amb}$ and K can be potentially compensated in the surround-lighting 130.

Implementation of control requires one or more sensors to be positioned on or near at least one of:

(a) a front surface of the monitor 20 facing approximately towards the viewer for sensing environmental illumination;

(b) a rear surface of the monitor 20 facing towards the region 40;

(c) on the back-lighting unit 100 directed towards the region 40; and (d) at the viewer 50, for example on a remote control unit provided for the viewer 50 to select preferred programme content.

In order to account for the spatial properties of the surround-lighting 130, the at least one sensor is beneficially arranged to measure $I_{sl}$ in respect of directions x and z; such measurement of $I_{sl}$ corresponds to determination radiation wavelengths λ of color components. Conveniently, the at least one sensor is implemented as a pixel array camera, for example a CCD camera mounted adjacent, or incorporated into, the unit 100 for imaging the region 40. The aforesaid control is implemented in a manner as depicted schematically in FIG. 5.

Figure 5:
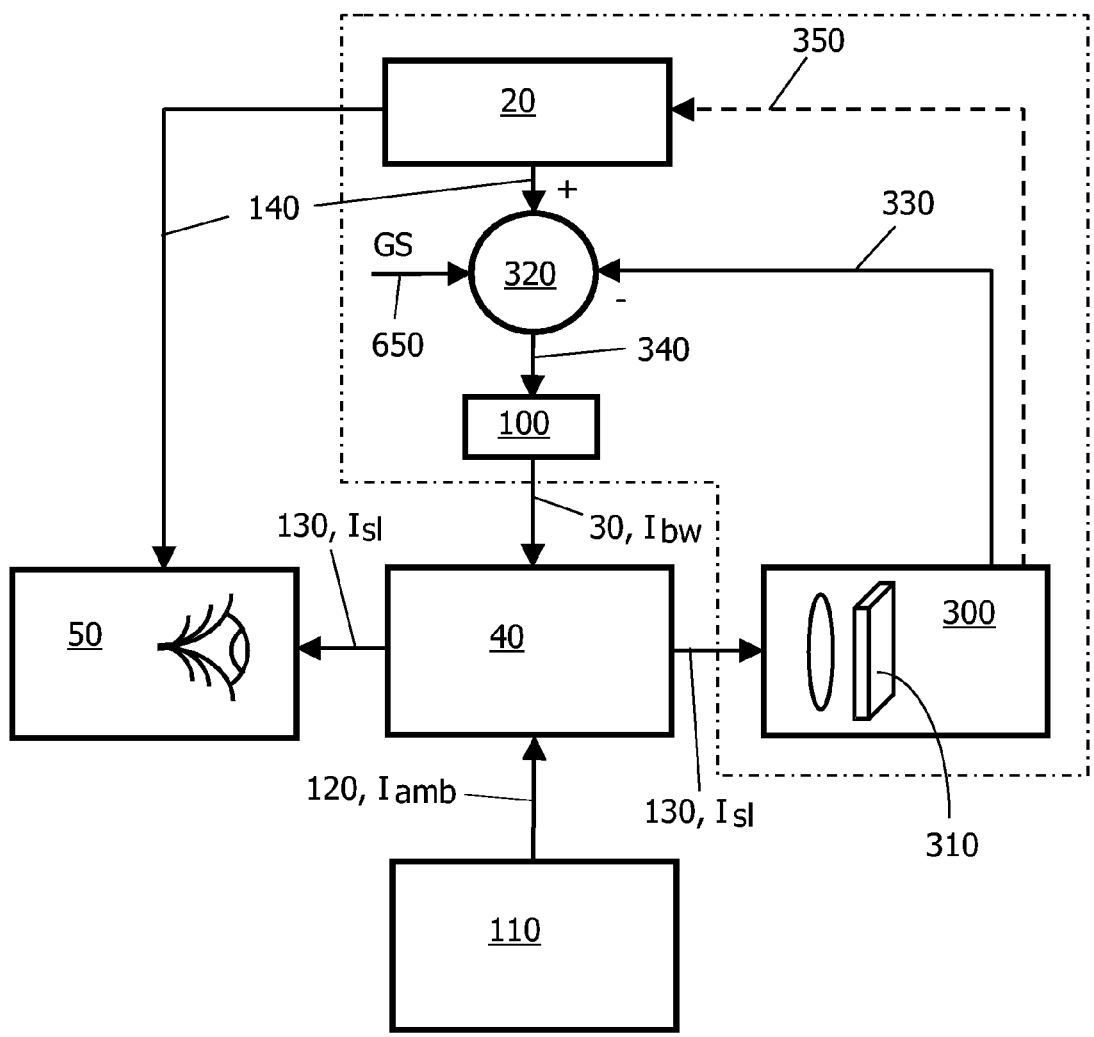
FIG. 5 is an illustration of an embodiment of the invention wherein compensation control of surround-illumination is provided.

In FIG. 5, the monitor 20 and its associating back-lighting unit 100 are supplemented by a light sensor 300, in this example being a pixel array camera 300 including imaging optical components for projecting a view of the surrounding illumination $I_{sl}$ onto a pixel photosensor array 310 for generating a corresponding representative sensor signal 330. The monitor 20 further comprises a controller, also called a summing unit, 320 for merging information concerning peripheral color of images presented on a display of the monitor 20 to the viewer 50 with the sensor signal 330 to generate an output signal 340 for the backward-lighting unit 100 so that, in operation, the surround lighting $I_{sl}$ is substantially matched to the aforesaid information concerning peripheral color denoted by 140; see FIG. 8 which is described later. The light sensor 300 may also be a single lightsensor or a group of light sensors distributed over locations at which relevant portions of the surrounding illumination $I_{sl}$ can be received.

Optionally, a feedback link 350 is included to provide for automatic feedback adjustment of color in images presented on the monitor 20; the pixel array camera 300 is then not only capable of assisting in providing feedback control of the surround lighting $I_{sl}$, but also synergistically enabling feedback control of image color rendition on the monitor 20. By including the feedback link 350, superlative matching of the surround lighting to images presented on the monitor 20 as perceived by the viewer 50 is capable of being achieved.

Figure 6:
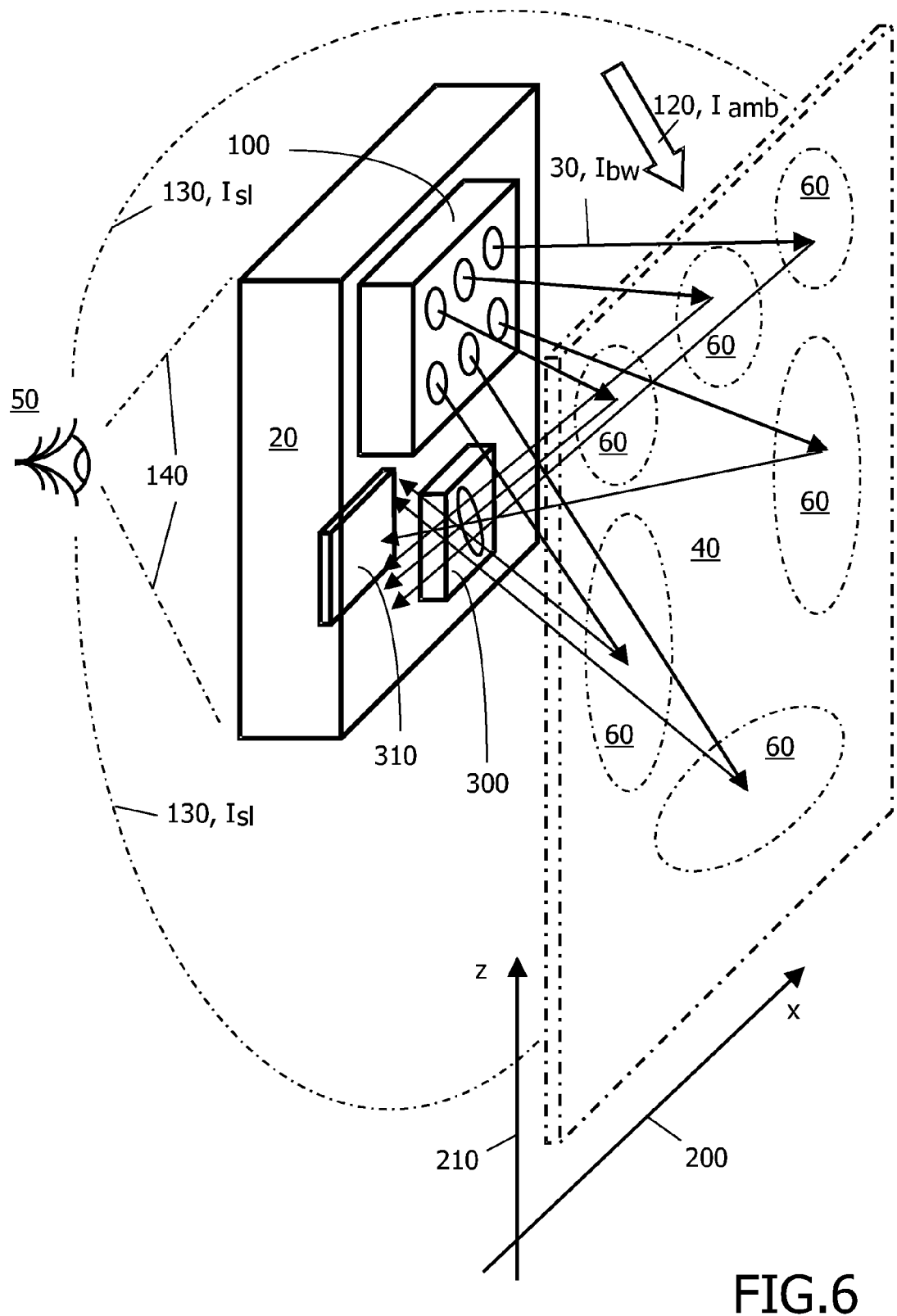
FIG. 6 is a schematic diagram of an embodiment of the invention illustrating placement of a backward-lighting unit and camera sensor behind a monitor relative to a viewer.

As described in the foregoing, the pixel array camera 300 can be mounted together with the unit 100 as illustrated in FIG. 6. The unit 100 is optionally provided with multiple light sources directed to specific associated parts of the region 40, namely the regions $H_1$ to $H_8$ in FIG. 8. Moreover, each light source is capable of generating a full spectrum of color. The light sources are optionally implemented by one or more of incandescent lamps, light emitting diodes, fluorescent light sources or scanned solid state lasers; however, other types of light sources are also possible to use. On account of the optical components of the camera 300 projecting an image of the region 40 onto the pixel array 310, pixels of the array 310 are associated with specific corresponding parts of the region 40. It is therefore possible to relate certain pixels to these certain parts of the region 40 and therefrom to certain of the light sources in the unit 100. Moreover, the light sources of the unit 100 are associated with corresponding peripheral regions of the monitor 20 on which images are displayed in operation. However, this spatial correspondence between given pixels with associated given lights of the unit 100 and therefrom to the monitor 20 display is influenced by relative distance of the monitor 20 from the region 40, for example a wall of room. When the monitor 20 is wall mounting, this spatial correspondence is substantially constant. However, the spatial correspondence can vary when the monitor 20 is free-standing. Optionally, the monitor 20 is provided with a processor (not shown) for processing the signal 330 from the camera 300 and controlling the unit 100 appropriately, this processor being capable of executing a calibration routine to determine the aforementioned correspondence between pixels of the camera 300 and corresponding lights in the unit 100.

Figure 7:
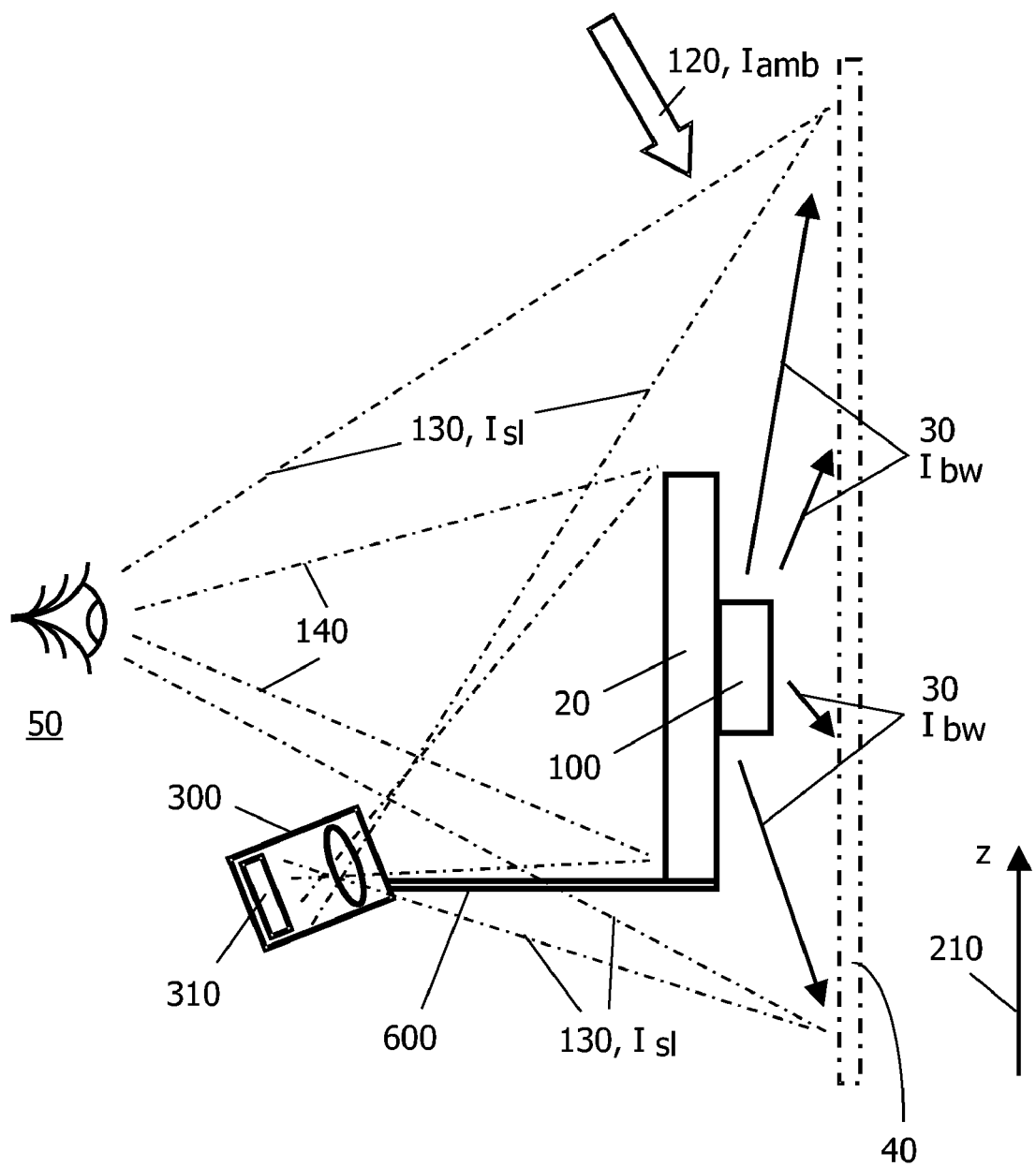
FIG. 7 is a schematic diagram of an embodiment of the invention illustrating placement of a backward-lighting unit behind a monitor relative to a viewer, and a camera sensor in front of a monitor relative to the user for providing color and/or illumination control of both surround-illumination and programme content images presented to the viewer on the monitor.

As an alternative to an arrangement illustrated in FIG. 6, the camera 300 is susceptible to being mounted on an elongate support arm 600 in front of the monitor 20 in an alternative configuration as illustrated in FIG. 7. An advantage of the configuration in FIG. 7 is that the camera 300 is also capable of monitoring color rendition on the display of the monitor 20 thereby not only providing for automatic feedback adjustment of the aforementioned surround lighting 130 $I_{sl}$ but also adjustment of color rendition of images presented on the image display of the monitor 20. As an alternative to employing the support arm 600, the camera 300 can alternatively be moveable on a pedestal support relative to the monitor 20; in such an arrangement, the camera 300 can be coupled to the monitor 20 by way of a wireless and/or optical link, thereby avoiding a need for cumbersome wires linking the camera 300 to the monitor 20.

If required, two cameras similar to the camera 300 can be employed in conjunction with the monitor 20 for use in feedback controlling the surround lighting 130 $I_{sl}$. Use of two cameras is capable of providing even more precise control of the surround lighting 130 by receiving views from different perspectives and then selecting an optimal compromise therebetween.

If required, the summing unit 320, for example implemented using software executing in the aforementioned processor (not shown), can also be provided with an option of at least partial user selection of preferred color control for the unit 100. Feedback control of the unit 100 from signals generated by the camera 300 is optionally continuously adjustable between fully automatic feedback control to manual control. Moreover, properties such as surround-lighting color hue and brightness relative to the image display of the monitor 20 are also optionally user adjustable by controlling offset and/or gain settings GS 650 applied to the summing unit 320.

As described earlier, when the region 40 is in constant spatial relationship in respect of the camera 300 and the unit 100, the monitor 20 with its associated unit 100 can be pre-calibrated or pre-set with regard to feedback control of surround lighting. However, when the camera 300 is moveable relative to the monitor 20 and/or the region 40 is moveable relative to the monitor 20, the processor incorporated within the monitor 20 is capable of invoking the display of the monitor 20 to blink and the lights of the unit 100 to selectively blink so that the processor is capable of dynamically uniquely associating pixels of the camera 300 with the image display of the monitor 20 and portions of the region 40 on which the halo 60 of the surround-lighting 130 is projected. Optionally, this blinking corresponds to a period of substantially one refresh update of an image on the display of the monitor 20 so that calibration of the pixels is so rapid so as to be substantially imperceptible to the viewer 50.

Adjustment of the surround-lighting 130 is optionally accommodated via a remote control unit of the monitor 20, this remote control unit being retained in close proximity to the viewer 50 when the monitor 20 is in operation, the remote control being useable also for selecting program channel volume and other operating parameters of the monitor 20.

Although use of the camera 300 for providing feedback control of the surround-lighting 130 is described in the foregoing, other types of sensor can be used. For example, sensors can be alternatively be placed in the region 40 to sense where the backward illumination $I_{bw}$ 30 is reflected from the region. The sensors in such an implementation can be mounted on an unobtrusive mesh which can be hung, attached or otherwise mounted at the region 40. The sensors mounted on the mesh can be electrically coupled to the monitor either by wire connection else by a wireless link.

In situations where there is significant ambient lighting $I_{amb}$, the feedback control of the surrounding illumination 130 enables the unit 100 to be operated at lower power than a situation where the monitor 20 with its associated unit 100 are required to operate in an otherwise dark room. Such lower power operation is capable of increasing operating longevity of the monitor 20 and also reducing heat dissipation therein.

The aforementioned processor for controlling feedback to the unit 100 is also capable of being programmed to cope with special effects such as bright flashes associated with explosions and similar events occurring in program content presented to the viewer on the monitor 20, thereby enabling hardware of the monitor 20 to perform synergistically more than one function.

In order to more completely describe the present invention, the surround-lighting $I_{sl}$, 130 will be described in overview with reference to FIG. 8. The monitor 20 on which images as described in the foregoing are presented has associated therewith several regions, for example peripheral regions $S_1$ to $S_8$ which are spatially distributed with reference to x and z axes 200, 210 respectively. Although these regions S are illustrated to form a complete margin, certain regions can be optionally omitted, for example the region $S_7$ when the halo 60 is not required beneath the monitor 20. The summing unit 320 optionally includes additional image processing circuits to determine an average hue and brightness for each of the regions $S_1$ to $S_8$, namely hues $h_{m1}$ to $h_{m8}$ and brightness $b_{m1}$ to $b_{m8}$ relate to the regions $S_1$ to $S_8$ respectively. Moreover, the summing unit 320 adjusts in operation corresponding hues $h_{h1}$ to $h_{h8}$ and brightness $b_{h1}$ to $b_{h8}$ of halo regions $H_1$ to $H_8$ respectively to be mutually similar to an accuracy as determined by the viewer 50; for example, the viewer 50 can select the brightness of the halo regions $H_1$ to $H_8$ to be in a range of 30% to 100% that of the regions $S_1$ to $S_8$. The halo regions $H_1$ to $H_8$ are also spatially distributed with reference to the aforementioned x and z axes 200, 210. Additionally, the viewer 50 can also optionally elect to switch off the surround-lighting 130 when not required. The summing unit 320 is operable to energize light sources in the unit 100 so that the color and brightness of the halo regions $H_1$ to $H_8$ track those of the regions $S_1$ to $S_8$ in a temporally gradual manner except when the hue and/or brightness of one or more of the regions $S_1$ to $S_8$ changes rapidly, for example in response to a complete changes of scene presented on the monitor 20. Moreover, as described in the foregoing, the surround-lighting 130 is, of course, feedback controlled via the camera 300 to enable optical color and reflection properties of the region 40 to be at least partially compensated when generating the surround-lighting 130. Hue and brightness of the regions $H_1$ to $H_8$ is mutually independently varying in operation in response to sequences of images presented on the monitor 20, thereby enabling the halo 60 to provide effectively a transitional area extension of the monitor 20 at potentially modest cost, the halo 60 on normal human viewing of the monitor 20 being in a sensory region of the human eye of the viewer 50 unable to resolve fine image detail.

It will be appreciated that embodiments of the invention described in the foregoing are susceptible to being modified without departing from the scope of the invention as defined by the accompanying claims.

Although light sources operable to generate the surround-lighting 130 are shown clustered in the unit 100, they can alternatively be located at a rear peripheral edge of the monitor 20. In such an arrangement, the light sources are optionally recessed so as not to be directly viewable by the viewer 50 but nevertheless unobstructed to generate the backward illumination 30 $I_{bw}$.

The inventor has envisaged that embodiments of the invention described in the foregoing are capable of being implemented in simplified form. Moreover, such simplified embodiments are operable to compensate for environmental light when the monitor 20 is positioned in front of a white wall. Environmental light, also referred to as environmental illumination, is assumed here to arise from sunlight, light emitted from table lamps, ceiling lights and similar types of domestic light sources.

Figure 9:
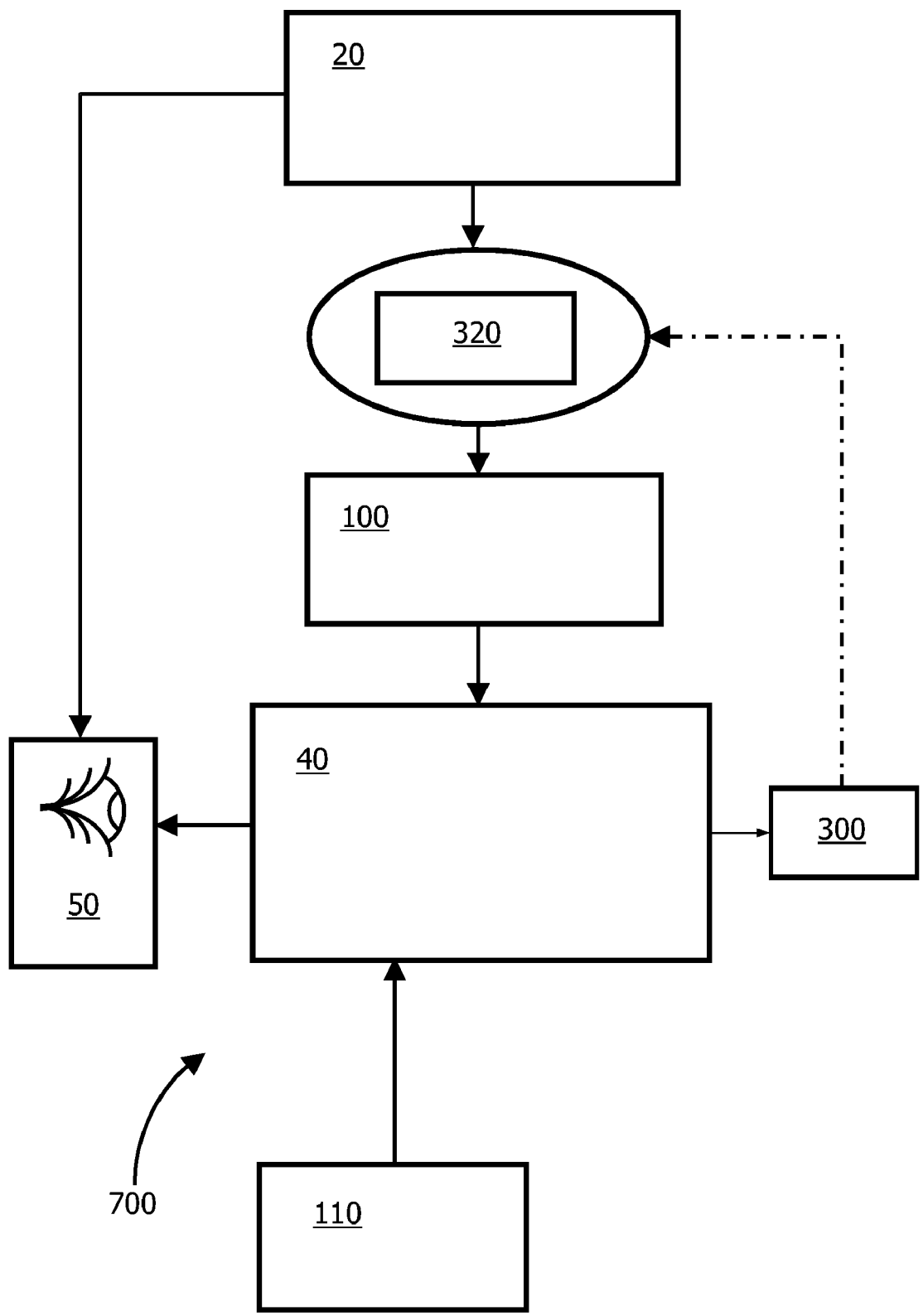
FIG. 9 is a schematic illustration of a simplified embodiment of the invention operable in a substantially feed-forward mode to compensate for environmental illumination.

A simplified embodiment of the invention is depicted in FIG. 9 wherein there is illustrated a system indicated generally by 700. The system 700 includes the monitor 20 equipped with a light sensor 300, optionally at a front side of the monitor 20 visible in normal operation to the viewer 50. The light sensor 300 is contemporarily included with televisions and is operable to measure intensity of light radiation received thereat and thereby adapt an image presented on the monitor 20 to environmental illumination incident on the monitor 20 and its close environs, for example by way of implementing an automatic brightness control for the monitor 20.

In operation, environmental light disturbs colored light radiation reflected from the aforementioned white surface, thereby representing a technical problem addressed by the system 700. The light sensor 300 in combination with the controller 320 are operable to adjust excitation applied to the back-lighting unit 100, thereby providing better color matching of light reflected from the white surface in respect of images presented on the monitor 20. Optionally, in the system 700, the light sensor 300 senses ambient illumination and functions in substantially a feed-forward mode of operation in contradistinction to more complex feedback arrangements as elucidated in the foregoing with reference to FIGS. 1 to 8. As such, the system 700 depicted in FIG. 9 is less costly and less complex than more advanced embodiments of the invention described in the foregoing with reference to FIGS. 1 to 8.

As an alternative, the system 700 is capable of being optionally configured to sense more specifically the region 40 and thereby provide at least partial feedback compensation of the surround-lighting in response to disturbance thereof due to environmental illumination.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A display system for presenting images to a viewer together with complementary peripheral surround-lighting, said system including:
   (a) a monitor for presenting the images to the viewer;
   (b) one or more lights for generating specific corresponding parts of a backward-illumination portion of said surround-lighting appearing in operation to the viewer as at least partially peripherally surrounding the monitor;
   (c) a controller for energizing said one or more lights in response to properties of one or more spatially distributed peripheral portions ($S_1$ to $S_8$) of the images presented on the monitor; and
   (d) one or more sensors for (d)(1) sensing specific spatially distributed portions of (i) backward-illumination of said surround-lighting and (ii) environmental illumination of said surround-lighting incident at the display system and (d)(2) generating one or more corresponding sensor signals, wherein the one or more sensors are associated with specific corresponding lights of said one or more lights, and wherein said controller is also arranged in operation to receive said one or more sensor signals for controlling corresponding specific lights of said one or more lights for at least partially compensating color ($h_{h1}$ to $h_{h8}$) and/or brightness ($b_{h1}$ to $b_{h8}$) of specific spatially distributed portions of the surround-lighting to influence from corresponding specific spatially distributed portions of the environmental illumination.

2. The display system as claimed in claim 1, wherein the one or more sensors operable in conjunction with the controller are arranged to function substantially in a feed-forward control manner to control said peripheral surround-lighting in response to the sensed environmental illumination.

3. The display system as claimed in claim 1, wherein the controller further controls the one or more lights in response to one or more user adjustable control parameters.

4. The display system as claimed in claim 1, wherein one or more lights are disposed so as to generate the specific spatially distributed backward-illumination portions of said surround-lighting by way of reflection of illumination provided in operation from said one or more lights from a surface in operation behind the monitor relative to the viewer.

5. The display system as claimed in claim 4, wherein said one or more sensors are positioned substantially at said surface wherefrom illumination from said one or more lights is reflected to generate the specific spatially distributed backward-illumination portions of said surround-lighting.

6. The display system as claimed in claim 1, wherein the controller is operable to at least partially compensate the specific spatially distributed portions of said surround-lighting from influence of the environmental illumination encountered in a location where the display system is deployed.

7. The display system as claimed in claim 1, wherein said one or more sensors are positioned so as to sense in operation the specific spatially distributed portions of said surround-lighting from substantially behind the monitor relative to the viewer.

8. The display system as claimed in claim 1, wherein said one or more sensors are positioned so as to sense in operation the specific spatially distributed portions of said surround-lighting in front of said monitor substantially intermediate between the monitor and the viewer.

9. The display system as claimed in claim 8, wherein said controller is further arranged to provide feedback color and/or brightness adjustment of both (i) the images presented in operation on said monitor and (ii) the spatially distributed portions of said surround-lighting.

10. The display system as claimed in claim 1, wherein said one or more sensors are implemented by one or more pixel array cameras operable to spatially sense the specific spatially distributed portions of said surround-lighting.

11. The display system as claimed in claim 1, wherein said controller is operable to substantially match specific spatially distributed halo regions of said surround-lighting ($H_1$ to $H_8$) to one or more colors at the corresponding one or more spatially distributed peripheral portions ($S_1$ to $S_8$) of the images presented on said monitor.

12. A surround-lighting device for a monitor operable to present images to a viewer, said device being operable to provide peripheral surround-lighting complementary to said images, said device comprising:
  (a) one or more lights for generating specific corresponding parts of a backward-illumination portion of said surround-lighting appearing in operation to the viewer as at least partially peripherally surrounding the monitor;
  (b) a controller for energizing said one or more lights in response to properties of one or more spatially distributed peripheral portions ($S_1$ to $S_8$) of the images presented on the monitor; and
  (c) one or more sensors for (d)(1) sensing spatially specific distributed portions of (i) backward-illumination of said surround-lighting and (ii) environmental illumination of said surround-lighting and (d)(2) generating one or more corresponding sensor signals, wherein the one or more sensors are associated with specific corresponding lights of said one or more lights, and wherein said controller is also arranged in operation to receive said one or more sensor signals for controlling corresponding specific lights of said one or more lights for at least partially compensating color and/or brightness of specific spatially distributed portions of the surround-lighting to influence from corresponding specific spatially distributed portions of the environmental illumination.

13. A method of controlling peripheral surround-lighting for a monitor operable to present images to a viewer, said method including steps of:
  (a) using one or more sensors for (a)(1) sensing specific spatially distributed portions of (i) backward-illumination of said surround-lighting (ii) environmental illumination of said surround-lighting and (a)(2) generating one or more corresponding sensor signals, wherein the one or more sensors are associated with specific corresponding lights of one or more lights; and
  (b) controlling energization of one or more lights for generating a backward-illumination portion of said surround-lighting in response to (i) properties of one or more spatially distributed peripheral portions ($S_1$ to $S_8$) of the images presented on the monitor, and (ii) said one or more sensor signals so that said peripheral spatially distributed portions of surround-lighting is complementary to said images, wherein the specific spatially distributed portions of surround-lighting are at least partially compensated for influences from corresponding specific spatially distributed portions of environmental illumination substantially at the monitor.

14. A method as claimed in claim 13, further comprising a step of selectively stimulating the monitor and the one or more lights for determining which of said sensor signals is representative of a corresponding spatially distributed peripheral halo portion of the surround-lighting and then controlling said one or more lights in accordance with said determined sensor signals representative of the corresponding spatially distributed peripheral halo portion of the surround-lighting.

15. A computer-readable medium embodied with computer program code that includes instructions executable by a processor for implementing a method as claimed in claim 13.

16. A sensor configuration for implementing said one or more sensors of the display system as claimed in claim 1.

* * * * *